Aug. 30, 1932.  F. L. SNYDER ET AL  1,874,824

AUTOMATIC CONTROL EQUIPMENT FOR LOAD TAP CHANGERS

Filed Dec. 27, 1930   2 Sheets-Sheet 1

WITNESSES:
Leon J. Taza
Carlton A. Bryant

INVENTORS.
Franklin L. Snyder and
Homer B. West.
BY
Wesley L. Carr
ATTORNEY

WITNESSES:
Leon J. Taga
Carlton F. Bryant

INVENTORS.
Franklin L Snyder and
Homer B. West.
BY
Chesley G. Carr
ATTORNEY

Patented Aug. 30, 1932

1,874,824

UNITED STATES PATENT OFFICE

FRANKLIN LLOYD SNYDER AND HOMER B. WEST, OF SHARON, PENNSYLVANIA, ASSIGNORS TO WESTINGHOUSE ELECTRIC AND MANUFACTURING COMPANY, A CORPORATION OF PENNSYLVANIA

AUTOMATIC CONTROL EQUIPMENT FOR LOAD TAP CHANGERS

Application filed December 27, 1930. Serial No. 505,104.

This invention relates generally to automatic control systems and has particular relation to the automatic operation of transformer tap changers.

The increasing growth and expansion of power systems is creating exacting requirements which transformer tap-changing-under-load equipment must meet. When tap-changing equipment is used to maintain a constant transformer-output voltage with a varying input or transmission line voltage, or to control the flow of wattless current between two systems that are connected together at one point through a transformer, or similarly to control the phase angle between the primary and secondary circuits of a transformer connecting two systems that are tied together at more than one point, it is highly desirable and frequently necessary that the tap changers used be designed for full automatic operation.

To meet this demand and to provide for improved performance in other respects, we have devised a system whereby transformer tap changers of known design may be utilized for automatic control by the addition of apparatus that is responsive to the change in the quantity it is desired that the equipment shall be operated to correct.

Thus, an object of our invention is to provide for the automatic control of motor-operated tap changers.

Another object of our invention is to provide an automatically controlled system for tap-changing-under-load equipment, in which only changes in the quantity regulated which persist for a predetermined time are effective in initiating a tap-changing operation and in which fluctuations of short or temporary duration are prevented from operating the tap-changing equipment.

A further object of our invention is to provide, in a system of the type described, means whereby a predetermined time delay may automatically be introduced between successive tap changes which result from continuous or uninterrupted initiating impulses.

The invention, together with additional objects and advantages thereof, will best be understood from the following description of specific embodiments, when read in conjunction with the accompanying drawings, in which.

Figure 1:
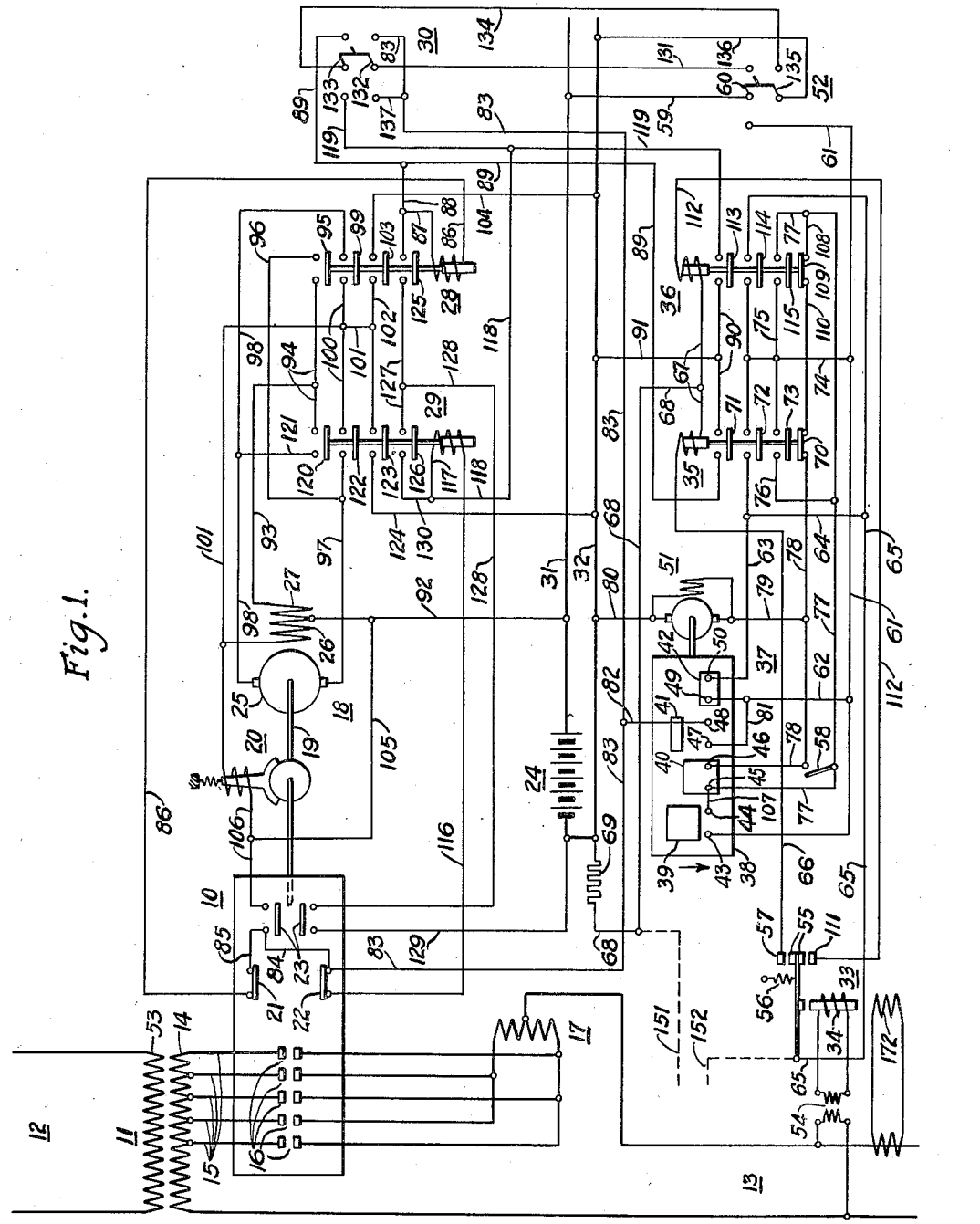
Figure 1 is a diagrammatic view schematically showing our invention applied to a tap changer which is arranged to automatically control the voltage in the circuit of a single-phase transformer with which the tap changer is associated without removing load from the transformer.

Referring to the drawings, and particularly Fig. 1 thereof, a preferred form of our invention is shown applied to a tap changer 10 associated with a single-phase power transformer 11 which is connected to the power circuits 12 and 13.

It is seen that one winding 14 of the transformer 11 is provided with a plurality of taps 15 that are connected to switches 16 of the tap changer. The switches 16 are arranged to be operated in a predetermined sequence for connecting the power circuit 13 to the portion of the transformer winding 14 which the circuit conditions may require or make desirable.

The tap changer illustrated utilizes a single-winding preventive auto-transformer that is well known in the art, this auto-transformer being shown at 17. The construction and operation of such tap changer is more fully described in Patents 1,709,724 and 1,763,133, both of which are assigned to the Westinghouse Electric & Manufacturing Company.

Tap switches 16 are actuated mechanically by means of cams (not shown) carried on a shaft which is arranged to be driven, through suitable reduction gearing, by an operating motor 18. The motor shaft 19 is provided with a magnetic brake 20 which may be of well known design. Limit switches 21 and 22, arranged to be opened by mechanical means when the tap changer has reached its limit of travel in the forward and reverse directions, respectively, together with "holding-in" switches 23 which are closed, also by mechanical means, during the time that a tap-changing operation is in progress, and are open when the mechanism is in the "on tap" positions, are also included in the operating mechanism of the tap changer indicated generally by the numeral 10.

In order to operate the tap-changing motor 18, any suitable source of power, such as a battery 24, is provided. The system illustrated is adapted for direct-current control and makes use of a compound-wound motor having an armature winding 25, a shunt field winding 26 and a series field winding 27. It will be understood that the control could be energized from an alternating-current source, in which case, an alternating-current motor would be employed.

To control the rotation of motor 18 in forward and reverse directions, respectively, remotely-controlled switches 28 and 29 are disposed between the motor and its source of power and may be of any suitable design but, as shown, are of the multi-contact electromagnetically operated type.

It will be apparent that switches 28 and 29 may be controlled by any suitable circuit-making device such, for instance, as from a remotely-located control switch 30 which may be actuated manually by an operator.

The control equipment thus far mentioned is that which may be utilized for manually controlling a motor-operated under-load-tap-changer of the type described and, as will be noted in the diagram of Fig. 1, it has all been shown above the horizontal control busses 31 and 32 which are energized by the battery 24, previously mentioned.

To adapt the tap-changing equipment just described for full automatic operation, we combine, with this portion of the control system, the additional apparatus shown in Fig. 1, below control busses 31 and 32.

The automatic equipment comprises, as the operation-initiating device, a primary relay 33 of the contact-making type provided with a winding 34 connected to the transformer circuit to be responsive to an electrical quantity thereof. The primary relay is so connected as to actuate interposing relays 35 and 36.

The interposing relays mentioned, in conjunction with a timing relay 37, perform the function of controlling the operation of motor-controlling switches 28 and 29. The relays 35 and 36 are represented as being of the electro-magnetically operated multi contact type.

The timing relay 37 just referred to is for the purpose of permitting only those changes in the transformer power circuit which persist for a predetermined time to actuate the motor-controlling switches to cause an operation of the tap changer. If desired, relay 37 may, in addition, be used to introduce a time delay between successive tap changes which result from an uninterrupted initiating impulse. It thus also prevents instantaneous or temporary fluctuations from initiating a tap-changing operation and also eliminates the objectionable "pumping" action to which equipment of this type would, under certain conditions, otherwise be susceptible.

As illustrated, the timing relay 37 is of the motor-driven rotatable-drum type, which is well known to the art. It comprises a rotatable drum 38, shown in the developed or unrolled form, which carries contact segments 39, 40, 41 and 42 that, in their movement with the drum, control circuits through stationary contact fingers 43, 44, 45, 46, 47, 48, 49 and 50. The drum is arranged to be driven by a suitable motor 51 through reduction gearing (not shown).

For selecting the manner in which the timing relay is to function, we arrange for connecting together, at will, studs 45 and 46 through a removable jumper or a suitable switch, as shown at 58. The switch 58 may be set by hand in the open or the closed position, as desired, to modify the relay operation, in a manner to be further explained.

In order that the tap-changer may be controlled manually or automatically, as desired, we provide an operation-transfer switch 52 which, in the left position, connects the supply conductor 31 to the timing relay 37 for automatic control, and, in the right position, connects the conductors 31 and 32 to the previously mentioned remote-control switch 30 which controls the manual operation of the tap-changer.

In the operation of our automatic control system described above, all tap-changing operations are initiated by the primary relay. The system illustrated, as will be evident, is suitable for maintaining a constant voltage in the circuit 13 which is supplied with power through the transformer 11 from the circuit 12, connected, as shown, to one winding 53 of the transformer. It will be assumed that the voltage of circuit 12 is subjected to fluctuations in value, such as might result from any one of a number of causes well known to the art.

Assume for the purpose of explanation, that, during a condition of normal voltage, in which the tap-changer 10 is set at some intermediate position, the voltage of the input circuit 12 drops. This will cause a similar decrease of potential in the output circuit 13 to which coil 34 of primary relay 33 is connected, either directly, or as illustrated, through a potential transformer, shown at 54. The resulting decrease in magnetization of the coil 34 will allow the armature, which carries contact members 55, to move upward, by the action of a spring 56, to close contact members 55 and 57.

In thus closing what may be termed its "raise" contacts, the primary relay energizes the actuating coil of interposing relay 35 through a circuit extending from positive control bus 31, through conductor 59, blade 60 of operation-transfer switch 52, assumed to have been closed to the left or "automatic" position, conductors 61 and 62, studs 49 and 50 of the timing relay 37—bridged, in the neutral position of drum 38, by a segment 42—conductors 63, 64 and 65, closed contacts 55 and 57 of primary relay 33, conductor 66, actuating coil of interposing relay 35, conductors 67 and 68 and a current-limiting resistor 69, to negative control bus 32.

Interposing relay 35 moves upward to its actuated position and, in so doing, opens contact 70, closes contact 71 which sets up, but does not complete, the actuating circuit for "forward" motor switch 28, closes contact 72, which bridges studs 49 and 50 of the timing relay, and closes contact 73 which energizes motor 51 of the timing relay 37 through a circuit extending from positive conductor 61, (energized through switch 52) conductors 74 and 75, closed contact 73 of relay 35, conductors 76 and 77, studs 45 and 46 of timing relay 37—bridged by segment 40 in the neutral position of drum 38, conductors 78 and 79, armature and field of motor 51 and conductor 80, to negative bus 32.

The motor 51 starts and rotates the timing drum 38, thus moving the contact segments 39, 40, 41 and 42 in a downward direction, as indicated by the arrow. If the primary-relay contact members 55 and 57 are maintained in engagement, the timing motor will continue to operate the drum for a predetermined time or until the segment 40 is disengaged from the contacts 45 and 46. If, as is assumed, the previously mentioned switch 58 is in its circuit-opening position, the segment 40 interrupts the motor circuit and causes drum 38 to stop in that position. Just before this "halting" position was reached, segment 41 had moved into engagement with studs 47 and 48 and energized the actuating coil of the forward motor switch 28 through a circuit extending from positive conductor 61, through conductors 62 and 81, timing-relay studs 47 and 48—bridged by segment 41, conductors 82, 83, 84 and 85, forward limit switch 21 of the tap-changer 10, conductor 86, actuating coil of forward motor switch 28, conductors 87, 88 and 89, closed contact 71 of interposing relay 35 and conductors 90 and 91 to negative bus 32.

In moving upward to the actuated position, motor switch 28 energizes the tap-changer motor 18 to cause it to rotate in a forward direction and operate the tap-changer to insert a larger portion of transformer winding 14 in the circuit 13. The motor-energizing circuit extends from positive bus 31, through conductor 92, series field 27 of the motor 18, conductors 93 and 94, closed contact 95 of motor switch 28, conductors 96 and 97, motor armature 25, conductor 98, closed contact 99 of switch 28, conductors 100, 101 and 102, closed contact 103 of switch 28 and conductor 104, to negative bus 32. It will be seen that, simultaneously, the shunt field 26 is energized from positive conductor 92 and the previously mentioned conductor 101. Likewise, the magnetic brake 20 is also released to allow motor shaft 19 to rotate the brake coil, the energizing circuit being from conductor 92, through conductors 105 and 106 and the release coil of the brake, to conductor 101.

Thus energized, motor 18 starts to rotate in a forward direction to operate the tap-changer, as has been explained, in a direction that raises the voltage of circuit 13, all in a manner well known to the art. The tap-changing operations continue without interruption, under the present assumption, until the voltage has been raised sufficiently to open contact members 55 and 57 of primary relay 33. Opening of the members 55 and 57, as will be seen, deenergizes the actuating coil of interposing relay 35 to allow it to return to the unactuated position shown in the diagram. This action allows, at the completion of the tap-changer operation then in progress, motor switch 28 to be deenergized and thereby open, all in a manner to be further explained.

In becoming deenergized, interposing relay 35 recloses contact 70, which again starts motor 51 of the timing relay 37 by completing the following circuit: from positive conductor 61 through studs 43 and 44 of timing relay 37—bridged in the halted position by segment 39, conductors 107, 77 and 108, closed contact 109 of interposing relay 36, conductor 110, contact 70 of relay 35, conductors 78 and 79, motor 51 and conductor 80, to negative bus 32.

Timing-relay drum 38 will thus begin to rotate under the action of energized motor 51 and will continue until the segments are brought back to their neutral position, at which time, segment 39 leaves studs 43 and 44, thus interrupting the motor circuit and halting the relay drum in the position shown.

Assume again that, during conditions of normal voltage, the potential of transformer supply circuit 12 rises. A similar increase in voltage occurs in circuit 13 and causes relay 33 to respond by pulling its armature down, closing "lower" contact members 55 and 111. This initiates a series of operations exactly like those resulting from closure of primary relay contact members 55 and 57 in the first assumption, except that interposing relay 36 acts instead of relay 35 and motor switch 29 acts in place of switch 28.

The control circuits, as will be seen, are similar to those already traced and described. Thus, interposing relay 36 is energized from positive conductor 61, through conductor 62, timing relay studs 49 and 50—bridged by segment 42, conductors 63, 64 and 65, primary relay contact elements 55 and 111, conductor 112, actuating coil of relay 36, conductors 67 and 68 and current-limiting resistor 69, to negative control bus 32.

In moving upward to the actuated position, relay 36 opens contact 109, closes contact 113 which sets up, but does not complete a circuit for actuating coil of reverse motor switch 29, closes contact 114 which bridges studs 49 and 50 of the timing relay 37, and closes contact 115 which energizes timing-relay motor 51, through the following circuit: from positive conductor 61, through conductors 74 and 75, contact 115 of relay 36, conductor 77, studs 45 and 46 of timing relay bridged by segment 40, conductors 78 and 79, motor 51 and conductor 80, to negative bus 32. The circuit by which contact 114 bridges studs 49 and 50 will be seen to extend from stud 49 of relay 37, through conductor 62, conductor 61, conductor 74, contact member 114 of relay 36 when in engagement with the two stationary studs shown above it, conductor 65, conductor 64, and conductor 63 back to stud 50 of relay 37.

The operation of the timing relay, is, as will be evident, exactly the same as in the previous case. After the predetermined time interval, assuming that primary relay contact members 55 and 111 remain continuously closed, timing-relay segment 41 moves into contact with studs 47 and 48, thus energizing the actuating coil of the "reverse" motor switch 29 through a circuit extending from positive conductor 61, through conductors 62 and 81, timing-relay studs 47 and 48—bridged by segment 41, conductors 82 and 83, "reverse" limit switch 22 of the tap-changer 10, conductor 116, actuating coil of motor switch 29, conductors 117, 118 and 119, closed contact 113 of interposing relay 36, and conductors 90 and 91, to negative bus 32.

Motor switch 29, in closing, energizes the operating motor 18 in such manner that it rotates in a reverse direction, instead of forwardly, as in the preceding case. The motor-energizing circuit extends from positive bus 31, through conductor 92, series field 27, conductors 93 and 94, closed contact 120 of motor switch 29, conductors 121 and 98, motor armature 25, conductor 97, closed contact 122 of switch 29, conductors 100, 101 and 102, closed contact 123 of switch 29 and conductor 124, to negative bus 32. The shunt field winding 26 and the release coil brake 20 are energized through the same circuit as traced in the preceding case.

Thus energized, motor 18 rotates in the reverse direction, for it will be noted that the direction of current flow through armature 25 has been reversed. The tap-changer is, consequently, operated in such manner as to decrease the ratio of voltage transformation of the transformer 11 and thereby lower the voltage of the secondary circuit 13. This operation continues uninterrupted, under the present assumption, until the voltage has been sufficiently lowered to open the primary relay contacts, when the interposing relay 36 is thereby deenergized and opens, permitting, as in the previous case, motor switch 29 to also open, upon the completion of the tap-changing operation then in progress.

In order that a tap-changing operation once started shall be completed, regardless of a premature opening of the primary relay contacts, the holding-in switches 23 already mentioned, serve, in conjunction with auxiliary contacts 125 and 126 of the motor switches 28 and 29, respectively, to maintain, continuously from the start to the completion of the tap-changing operation, a separate energizing circuit for the actuating coil of the motor switch which has been closed. The holding circuit may be traced, for the forward motor switch 28, from positive bus 31, through conductors 92, 105 and 106, holding-in switch 23, (closed immediately after start and so maintained until completion of tap changer operation) conductor 85, forward limit switch 21, conductor 86, actuating coil of motor switch 28, conductors 87 and 88, closed auxiliary contact 125 of switch 28, conductors 127 and 128, second closed holding-in switch 23 and conductor 129, to the negative pole of battery 24.

For the reverse motor switch 29, a similar holding circuit is set up from positive bus 31, through conductors 92, 105 and 106, first holding-in switch 23, conductor 84, reverse limit switch 22, conductor 116, actuating coil of motor switch 29, conductors 117 and 130, closed auxiliary contact 126 of switch 29, conductors 127 and 128, second holding-in switch 23 and conductor 129 to negative pole of battery 24.

It will be seen that these holding circuits just traced, when once established by the closing of the motor switch 28 or 29, which closed auxiliary contacts 125 or 126 respectively, and the movement of the tap-changer from its normal tap position, which closes transition interlocks 23, as previously explained, are independent of any premature opening of either of the interposing relays 35 and 36. They thus assure that a tap-change operation, once started, will be completed, and, when completed, interrupt themselves by the opening of the transition interlocks 23, in the manner already indicated.

If the contact members of the primary relay, for any reason, remain closed after the tap-changer has been advanced to its limit of travel in either direction, the operating motor 18 will be deenergized by the opening of one of the limit switches 21 and 22, depending upon the direction of the tap-changing operating in which the limit of travel has been reached. This interrupts the actuating circuit of one of the associated motor switches 28 and 29 and thus allows it to open.

The operations so far described are those which occur when the switch 58, before mentioned as bridging studs 45 and 46 of the timing relay 37, is set in the open position. As has been noted for this condition, no time delay is introduced between successive tap-changing operations, they follow one another without interruption until stopped by action of the primary or by the limit switches.

Closure of switch 58 modifies the functioning of the timing relay to the extent that, in addition to making necesary a continuous closure of the primary relay contacts for a predetermined time before the actuating impulse can be transmitted to the motor switches, it introduces a similar time interval between the starting of successive tap-changing operations.

It will have been noted that, with switch 58 open, drum segment 40 stops timing motor 51 by leaving studs 45 and 46 immediately after segment 41 comes into contact with studs 47 and 48. Drum 38 thus halts in this position so that segment 41 transmits a continuous actuating impulse to the motor switches until the primary relay contacts open, at which time the drum is returned to the original neutral position.

Closure of switch 58 by-passes the timing-motor circuit around studs 45 and 46, causing drum 38 to be continuously rotated as long as primary relay contacts remain closed. During each revolution of the drum, segment 41 passes over and bridges studs 47 and 48, thereby energizing the actuating circuit for motor switch 28 or motor switch 29, which closes and locks itself in until the given tap-changing operation has been completed, in the manner hereinbefore explained.

Some time before the timing drum has advanced, through another or the following revolution, to again bring segment 41 into contact with studs 47 and 48, the previously initiated tap-changing operation has completed itself, and the equipment is ready to receive the next actuating impulse, which is given in exactly the same manner as the original.

We have thus provided for introducing definite time intervals between successive tap changes, a feature of operation which is frequently desirable in the operation of tap changing equipments, as is well known to the art.

It will further be appreciated that provision for obtaining selective functioning of the timing relay, such as our system affords, further broadens the already wide range of applicability to which the automatic control scheme of our invention so readily lends itself.

Should it be desired to control the tap changer manually from the remote control switch 30, the transfer switch 52 may be shifted to the right-hand or "manual" position in which it will connect the remote control switch 30 to control busses 31 and 32. To operate the tap changer to raise the ratio of voltage transformation, control switch 30 is placed to the left-hand or "forward" position, in which it energizes the actuating coil of forward motor switch 28 through a circuit from the positive bus 31, through conductor 59, blade 60 of transfer switch 52, in its right-hand position, conductor 131, blade 132 of control switch 30, conductors 137, 83, 84 and 85, forward limit switch 21, conductor 86, actuating coil of motor switch 28, conductors 87, 88 and 89, blade 133 of control switch 30, in its right-hand position, conductor 134, blade 135 of transfer switch 52, in its right-hand position and conductor 136 to the negative bus 32. The switch 28, thus actuated, causes the motor to operate the tap-changer in a forward direction, as already explained.

Likewise, if it is desired to manually operate the tap changer to lower the ratio of voltage transformation, this may be done by placing control switch 30 to the right-hand or "reverse" position in which it energizes the actuating coil of "reverse" motor switch 29 through a circuit extending from positive conductor 131, through blade 132 of control switch 30, conductor 137, wire 83, reverse limit switch 22, conductor 116, actuating coil of reverse motor switch 29, conductors 117, 118 and 119 and blade 133 of control switch 30, to negative conductor 134. Reverse motor switch 29, thus actuated, runs the tap-changer in a reverse direction, as already explained.

It will be understood that, while we have shown our invention as embodied in tap-changers for single-phase transformers, it is not to be thus limited but may be readily applicable to other types, for example, tap-changers for polyphase transformers connected in any of the manners well known in the art.

Figure 2:
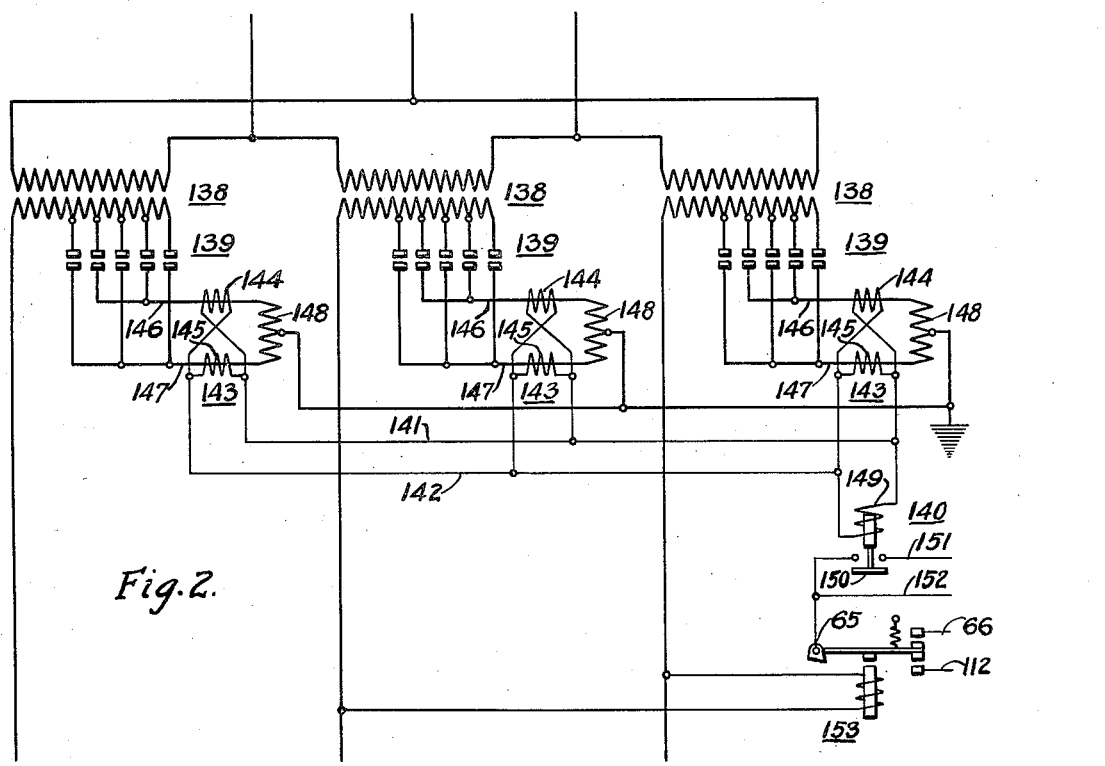
Fig. 2 is a diagrammatic view of an out-of-step protective scheme utilized with our invention, when applied to the automatic control of a plurality of individual tap changers applied to the several transformers of a bank.

The description thus far has related to the operation of a single tap-changer. In cases in which a plurality of tap-changers are operated from a single automatic control equipment, there is the possibility that one or more of the tap-changers may, for some reason, fail to move off position when a tap-change is initiated or may become stalled between positions. Fig. 2, showing a three-phase transformer bank comprising three single-phase units 138, each equipped with its individual tap-changer 139, illustrates one application in which this might occur.

The tap-changer units 139 illustrated in Fig. 2 are each identical with the tap-changer shown at 10 in Fig. 1, each unit being provided with its operating motor and motor-control switches (not shown in Fig. 2) arranged and connected as in the upper portion of Fig. 1. The motor switch-actuating circuits of all units are arranged for simultaneous automatic control from the system of our invention which, as has been pointed out, is shown in the lower portion of Fig. 1 and the detailed operation of which has already been explained.

In practicing our invention, we provide protective means responsive to an out-of-step position of any one of the tap-changers so operated. If, when a tap-change is initiated, one or more of the tap-changers should fail to move off position or should become stalled or stopped between positions, the remaining tap-changers will move to the next position and stop, and it will not be possible to make further tap changes automatically until all tap-changers have again been placed in the proper positions.

To attain this end, an out-of-step responsive relay 140 is connected, in the example shown, in the common secondary circuit conductors 141 and 142 of three pairs of current transformers 143, the units 144 and 145 of each pair being connected in opposition and disposed in the leads 146 and 147, respectively, of the tap-changer preventive autotransformer 148, all in the manner illustrated in Fig. 2.

As is more fully explained in Patent 1,729,099, assigned to the Westinghouse Electric & Manufacturing Company, an out-of-step position of any of the three tap-changers sets up a net unbalance in the current in the common circuit of the current-transformer secondaries in which unbalanced current flows through the actuating coil 149 of relay 140, causing the relay to close contacts 150.

The contacts of relay 140 (Fig. 2) are connected in the automatic control circuit of Fig. 1 to bridge conductors 68 and 65, connections between Figs. 1 and 2 being represented by leads 151 and 152 (shown by dotted lines in Fig. 1).

It will be seen that the closure of these out-of-step relay contacts 150 shunts the operating coil of the interposing relays 35 and 36, represented in Fig. 1, and thus prevents their energization by the primary relay. In the system of Fig. 2, the primary relay may be connected as shown at 153, and tied in with the system of Fig. 1 through leads 66 and 112.

It is evident, therefore, that the actuations of the relay 140 renders the automatic equipment incapable of initiating further tap changes until the out-of-step condition has been corrected. Suitable means (not shown) for indicating operation of the out-of-step relay may be combined with our automatic system in a manner well known in the art.

It will be readily understood that the out-of-step tap-changer unit may be brought back into step in any suitable manner. One method for accomplishing this is to provide, in the motor-switch-actuating circuits of each tap-changer, a removable test link or other disconnecting device (not shown) which, when removed or opened in the circuits of the out-of-step tap-changer, permits that unit to remain stationary while the other units may be operated manually and brought to the tap position of the stationary unit, where they are stopped. Replacement of the removed test link then restores the system to the normal condition desired.

The contact-making primary relay 33, illustrated in Fig. 1 (also in Fig. 2 at 153) is, as has been explained, adapted to be responsive to voltage changes in the circuit to which it is connected. It will be evident, however, that the control system of our invention may also be used with primary relays which are responsive to other conditions of the power circuits with which the transformer and tap-changer are associated.

Figure 3:
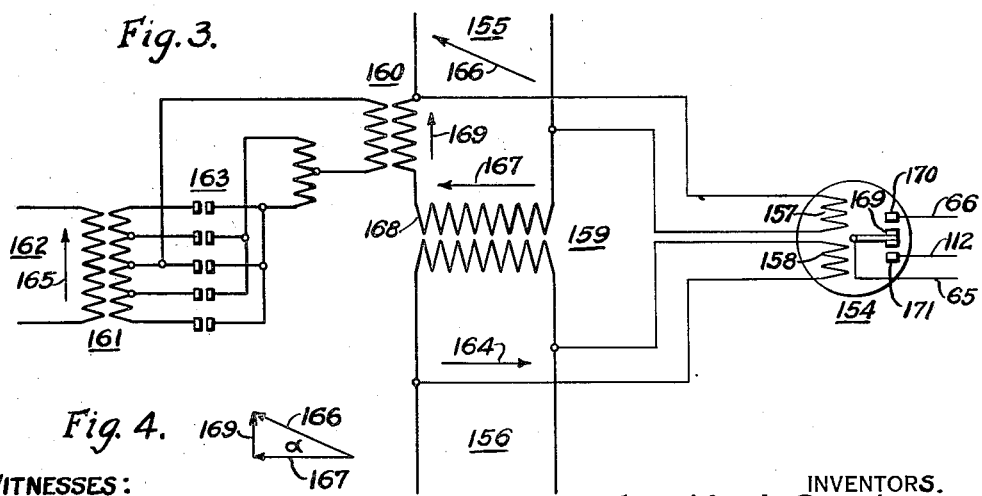
Fig. 3 is a diagrammatic view illustrating the connections of a primary relay through the use of which our invention may be applied to automatically control tap changers used for phase-angle regulation.

Fig. 3 shows, at 154, a primary relay of the contact-making type, which is adapted to be responsive to the phase angle between the voltage in circuits 155 and 156 to which the two relay coils 157 and 158 are respectively connected. This relay is tied in with the system of Fig. 1 through leads 65, 66 and 112. In the system with which this relay is illustrated, 159 is a main transformer through which power may be transferred between circuits 155 and 156. Included in circuit 155, is a series transformer 160 excited from some suitable regulating transformer 161.

To provide a voltage which may be used for phase-shifting purposes, this regulating transformer is supplied with power from any suitable source 162 in which the voltage bears a quadrature or substantial out-of-phase relation to the voltage in the main circuit 156. Interposed between the regulating and series transformers, is a tap-changing equipment 163 disposed to control, in response to the action of primary relay 154, the magnitude and direction of the phase shift of the voltage in circuit 155.

It will be seen that such a system (as in Fig. 3) is capable of phase-angle control, since it provides for the adding of an adjustable voltage at an angle to the reference voltage. It will be further evident that, through the use of the phase-angle responsive primary relay, the apparatus and scheme already disclosed for changing taps under load to obtain voltage control is adaptable to changing phase angle under load. Thus, the automatic control circuits shown in Fig. 1 may be applied, without change, to the system of Fig. 3 to effect automatic operation of tap changer 163 from primary relay 154.

By way of explanation, assume that, at some given instant, the voltage vector of the main power circuit 156 is horizontal, as shown at 164, then the voltage vector of regulating supply circuit 162 will be substantially vertical at 165.

Figure 4:
Fig. 4 is a vector diagram illustrating the relative phase positions of the several voltages which act in the phase-angle regulating system of Fig. 3.

To obtain the desired power flow through transformer 159, it may be assumed that the vector of the voltage in circuit 155 must be shifted to some intermediate position 166, and, to effect this shift, it is evident that to vector 167, representing the voltage in winding 168 of the main transformer, a quadrature voltage vector 169 must be added. Fig. 4 illustrates the vector combinations for such condition. The magnitude and direction (positive or negative) of this phase-shifting vector 169 is dependent upon the setting of tap-changer 163, connected as shown, a condition which will be apparent to those skilled in the art, which setting is controlled by action of the primary relay 154, in a manner to be explained.

Responsiveness of primary relay 154 to changes in phase angle is effected through the combined action of coils 157 and 158, acted upon by the voltages in circuits 155 and 156, respectively. A movable contact element 169 is disposed in the relay to be held, by the combined action of the two coils, in the neutral or mid-position (shown) when the voltages bear a given phase relation to each other, and to contact with stationary elements 170 or 171 when the phase angle deviates respectively in the one or the other direction from the given value. It will be recognized that suitable calibrating or adjusting means may be combined with the relay to enable selection of the neutral or open contact position for the value of phase displacement which it is desired that the tap-changer be automatically operated to maintain.

Returning to the assumption that this desired phase relation is as shown by the vectors of Fig. 4, (a displacement of angle alpha in the vector triangle) relay contact 169 will be maintained in the neutral or mid-position as long as such phase relation obtains. Should the phase displacement change because of shifting conditions of voltage or power in circuits 155 or 156, primary relay 154 immediately detects that change and causes contact member 169 to move into contact with member 170 or member 171, depending upon the direction in which change took place. This initiates, through our system of automatic control, operation of the tap-changer 163 in such direction as to return the phase displacement to its original desired value, the re-establishment of this condition returning the primary relay to the neutral position.

It will be evident that, by adding to the primary relay 33 of Fig. 1 a coil responsive to the current in the transformer power circuit, such as 172, (shown in Fig. 1) the relay may be made responsive to power-flow characteristics. When combined with the circuit of Fig. 3 to take the place of primary relay 154 there shown, the system for phase-angle regulation there illustrated may be made to automatically regulate the power flow through the main transformer.

By further modifications well known in the art, a primary relay responsive to the flow of wattless power through a transformer may be made up and, likewise, substituted for relay 33 in the system of voltage control of Fig. 1, in which case, the system of our invention may be made to automatically regulate the flow of wattless power through the main transformer.

Thus, although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. An automatic control system for load tap changers associated with transformers connected in power circuits, comprising, in combination, a motor for operating the tap changer, a source of power and a circuit for the motor, switches in the motor circuit disposed to control the forward and the reverse rotation of the motor, actuating circuits for the switches, a timing relay disposed in said actuating circuits to time the switch operations, an actuating circuit for the timing relay, an interposing relay disposed in the actuating circuit of each switch, in combination with the timing relay to initiate the switch operation, actuating circuits for the interposing relays, and a primary relay disposed in the actuating circuits of the interposing relays to control their operation, said primary relay being responsive to changes in the transformer power circuits.

2. An automatic control system for load tap changers associated with transformers connected in power circuits, comprising, in combination, means for operating the tap changer, a source of power and actuating circuits for said operating means, a timing relay disposed in said actuating circuits, an actuating circuit for the timing relay, interposing relays disposed, in combination with the timing relay, in the actuating circuits of said operating means to control, respectively, the forward and the reverse operation thereof, said timing relay acting to necessitate that an interposing relay be held closed for a predetermined time before its actuating impulse can be transmitted to the operating means, actuating circuits for said interposing relays, and a primary relay disposed in the actuating circuits of the interposing relays to selectively control their operation, said primary relay being responsive to changes in the transformer power circuits.

3. An automatic control system for load tap changers associated with transformers connected in power circuits, comprising, in combination, a motor for operating the tap changer, a source of power and circuits for the motor, a switch in the motor circuit disposed to control the forward rotation of the motor, a second switch in the motor circuit disposed to control the reverse rotation of the motor, actuating circuits for said switches, a timing relay disposed in said switch-actuating circuits, an actuating circuit for the timing relay, an interposing relay disposed, in combination with the timing relay, in the actuating circuit of each switch to control the operation thereof, said timing relay acting to necessitate that either interposing relay remain closed for a predetermined time before its actuating impulse can be transmitted to the associated motor switch, actuating circuits for said interposing relays, and a primary relay disposed in the actuating circuits of the interposing relays to selectively control their operation, said primary relay being responsive to changes in the transformer power circuits.

4. An automatic control system for load tap changers associated with transformers connected in power circuits, comprising, in combination, a motor for operating the tap changer, a source of power and circuits for the motor, a switch in the motor circuit disposed to control the forward rotation of the motor, a second switch in the motor circuit disposed to control the reverse rotation of the motor, actuating circuits for said switches, a timing relay disposed in said switch-actuating circuits, an actuating circuit for the timing relay, an interposing relay disposed, in combination with the timing relay, in the actuating circuit of each switch to control the operation thereof, said timing relay acting to necessitate that either interposing relay remain closed for a predetermined time before its actuating impulse can be transmitted to the associated motor switch, the same timing relay being further disposed to introduce a predetermined time delay between successive motor-switch actuations for tap-changing operations which result from a continuous actuating impulse, actuating circuits for said interposing relays, and a primary relay disposed in the actuating circuits of the interposing relays to selectively control their operation, said primary relay being responsive to changes in the transformer power circuits.

5. An automatic control system for load tap changers associated with transformers connected in power circuits comprising motive means for operating the tap changer, control means for said motive means, a timing relay and an interposing relay disposed in combination to influence said control means, said timing relay being controlled by the actuation of said interposing relay, and a primary relay, responsive to changes in the transformer power circuits, for controlling the actuation of said interposing relay, said timing relay being disposed to require that an operation initiating impulse by the primary relay be continuous for a predetermined time before said motive control means can be actuated thereby.

6. An automatic control system for load tap changers associated with transformers connected in power circuits comprising motive means for operating the tap changer, control means for said motive means, a timing relay and an interposing relay disposed in combination to influence said control means, said timing relay being controlled by the actuation of said interposing relay, and a primary relay, responsive to changes in the transformer power circuits, for controlling the actuation of said interposing relay, said timing relay being disposed to introduce a predetermined time delay between successive tap-changing operations which result from a continuous operation initiating impulse by the primary relay.

7. In an automatic control system for transformer tap changers, the combination with motive-control means for controlling the operation of the tap changer and operation-initiating means, responsive to changes in a predetermined condition, for influencing said motive-control means, of a timing relay and associated control relays disposed intermediate said operation-initiating means and said motive-control means in a manner that an impulse from the operation-initiating means must persist for a predetermined time before it is permitted to influence the motive-control means, said combination being further disposed to introduce a predetermined time delay between successive tap-changing operations which result from a continuous impulse by said operation-initiating means.

In testimony whereof, we have hereunto subscribed our names this 22nd day of December, 1930.

FRANKLIN LLOYD SNYDER.
HOMER B. WEST.